United States Patent

[11] 3,554,444

[72] Inventor Jack M. Hochman
 Boonton, N.J.
[21] Appl. No. 803,290
[22] Filed Feb. 28, 1969
[45] Patented Jan. 12, 1971
[73] Assignee Esso Research and Engineering Company
 a corporation of Delaware

[54] METHOD AND NOZZLE FOR INJECTING ONE FLUID INTO ANOTHER FLUID
 2 Claims, 5 Drawing Figs.
[52] U.S. Cl.................................................... 239/8,
 239/502, 239/553.5, 239/598
[51] Int. Cl....................................................... A01n 17/02
[50] Field of Search.......................................... 239/597,
 598, 599, 502X, 553, 553.5X, 554, 8

[56] References Cited
 UNITED STATES PATENTS
 1,335,267 3/1920 Ambrose et al............... 239/598X
 2,792,780 5/1957 Jacob............................ 239/553.5
 3,342,193 9/1967 Deering et al. ............... 239/553.5

Primary Examiner—Lloyd L. King
Attorneys—Pearlman and Stahl and N. Elton Dry

ABSTRACT: This invention provides an improved apparatus for discharging a horizontally flowing fluid stream in a substantially vertical direction by means of a horizontally positioned, elongated conduit quench nozzle wherein two channels are provided for fluid flow therethrough, the two channels having fluid turning vanes that split the fluid flow into a plurality of streams as the fluid exits vertically from the quench nozzle.

PATENTED JAN 12 1971      3,554,444

J. M. Hochman   Inventor

By    N. Elton Dry   Attorney

METHOD AND NOZZLE FOR INJECTING ONE FLUID INTO ANOTHER FLUID

BACKGROUND OF THE INVENTION

1. Field of the Invention

This invention relates to an improved method and apparatus for discharging a horizontally flowing fluid in a substantially vertical direction. More particularly, the invention relates to an improved nozzle for discharging a horizontally flowing fluid in a vertically directed, substantially symmetrical pattern.

2. Description of the Prior Art

It is often desired to introduce a fluid under pressure into a lower pressure fluid medium in such manner that the introduced fluid is discharged vertically into the lower pressure medium in a flow pattern distributed substantially uniformly about a vertical axis. Such application is frequently encountered in the processing industries wherein the fluid under pressure is introduced into a lower pressure fluid medium within an enclosed vessel or container. The requirement of vertical discharge is particularly critical where the fluid under pressure is introduced onto a distributor tray of a contact vessel for admixture with a second fluid mass flowing downwardly through the vessel, especially where the downwardly flowing fluid mass contains mixed liquid and gas phases. Poor distribution, or channeling, of the downwardly flowing fluid reduces the efficiency of the processing step; further inefficiencies being caused by improper mixing of the injected fluid with the downwardly flowing fluid mass.

One typical application to which this invention is directed is the injection of a quench fluid into a liquid-gas mixed-phase reaction mixture flowing downwardly through a vertical contacting vessel, the fluid injection being made at one or more intermediate points along the vertical length of the vessel. The quench fluid is at a temperature different from that of the reactants, and is employed as a simple means of heating or cooling the reactants by direct contact therewith. In order that proper temperature control is achieved, it is necessary that the injected quench fluid be uniformly mixed with the downflowing reactants and evenly distributed over the horizontal cross section of the vessel. Uniform mixing and redistribution can be effected by a number of different distributor arrangements conventionally employed for such purposes. With some of these devices, superior results are often achieved where the ejected fluid is symmetrically discharged in a vertical direction at the midpoint of the vessel. Discharge of the ejected fluid with any substantial horizontal asymmetry tends to produce uneven distribution of the ejected fluid within the downwardly flowing fluid mass.

A conventional method of accomplishing the symmetrical discharge of a fluid vertically onto a mixing or distribution tray of a down flow contacting vessel is to insert through the sidewall of the vessel a horizontal pipe terminating in a 90° elbow and vertical nipple, or pipe extension, pointing downwardly toward the center of the distribution tray. The downwardly directed pipe must be of sufficient length that the fluid flowing therethrough will be flowing in a substantially vertical direction with essentially no horizontal component of flow when discharged onto the tray. Although satisfactory fluid distribution can be achieved with such apparatus, the elbow and vertical nipple combination has the disadvantages of being difficult to remove through the entry opening in the sidewall of the vessel and requiring vertical clearance to accommodate the vertical pipe extension.

A horizontal pipe with a closed end wall and a vertically directed aperture effectively minimizes the withdrawal problem and the requirement of additional vertical clearance. However, the fluid is not discharged therefrom in a satisfactory pattern. The horizontally flowing fluid, because of its inertia, does not discharge through the aperture in a substantially symmetrical pattern but, depending on the relative configuration of the pipe and of the aperture, a major portion of the fluid is more likely to discharge at an angle of approximately 45° from horizontal and in the original direction of flow. This is particularly true in a case of quench nozzles having vertically directed vanes originating inside the nozzle chamber and terminating at the nozzle aperture due to the fact that the fluid flowing through the shortest distance to the aperture and exiting therefrom has exerted upon it the least resistance and will therefore exit the nozzle with the greatest pressure diverting the fluid flowing the longest route through the nozzle and exiting at the other side of the aperture.

Summary of the Invention

The improved method for discharging a horizontally flowing fluid in a substantially vertical direction comprises transporting a fluid from a higher pressure source to a lower pressure medium through an enclosed conduit, the fluid flowing in a substantially horizontal direction within the lower pressure medium; dividing the fluid into at least two essentially equal streams within the conduit so that the so-formed first and second streams flow within separate channels of the conduit from the source of the streams until they are discharged from said conduit; dividing at least one of the first and second fluid streams into a plurality of streams while changing the direction of flow of said divided stream 180° to the stream's original direction of flow; and dividing each of said first and second fluid streams into a plurality of streams while diverting their direction of flow from the horizontal to a vertical direction, the streams being then discharged through an aperture into said low pressure medium as a plurality of vertically directed smaller streams.

The novel apparatus for discharging a horizontally flowing fluid stream in a substantially vertical direction comprises a horizontally positioned, elongated conduit having a closed end and an open end, said conduit being divided into at least two channels of substantially equal cross-sectional area extending from the open end of said conduit to a point just short of the closed end of said conduit; said channels being separated from each other by a horizontal baffle extending from one inside wall of said conduit to the opposite inside wall thereof and said baffle extending from the open end of said conduit to a point short of the closed end of said conduit, said conduit having a vertically directed aperture therein at a point removed from said closed end; at least one channel being in fluid communication with the aperture by means of a plurality of channels formed by a plurality of turning vanes positioned between the end of said baffle and the closed end of said conduit, each of said turning vanes forming a trough extending laterally across said conduit in diminishing size from the trough located nearest the closed end of said conduit; and further providing a vertical transverse baffle attached to said horizontal baffle normal to the axis of said conduit and positioned adjacent and substantially at the midpoint of said aperture so as to divert fluid flowing in either direction toward said aperture outwardly through said aperture, and adjacent said vertical transverse baffle on both sides thereof a plurality of turning vanes each forming an arc commencing at a point just before reaching the periphery of said aperture and terminating at the aperture. Ideally, the distance between the end of the baffle, which extends from one inside wall of the conduit to the opposite inside wall thereof and extending the length of the conduit, and the closed end of said conduit is equal to about one-half the diameter of the conduit.

Description of the Preferred Embodiments

The invention will be more readily understood from a reading of the following specification and by reference to the accompanying drawings wherein an example of the invention is shown, and wherein.

Figure 1:
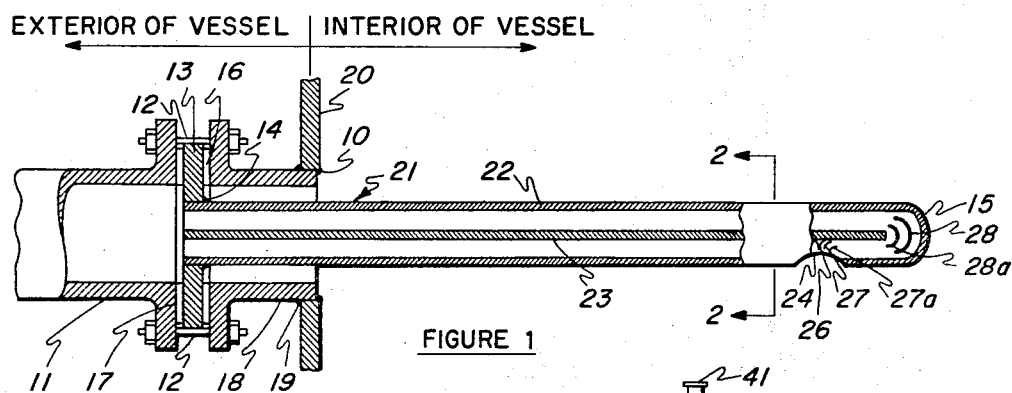
FIG. 1 is an elevational view, in partial cross section, showing a horizontal nozzle installed through the sidewall of a vessel.

Turning to the drawing, numeral 21 designates the horizontal nozzle. Referring now to FIG. 1, nozzle 21 is seen entering through an opening in vessel sidewall 20. Nozzle 21 comprises a conduit 22 having a closed end 15 and a vertically directed aperture 24 removed from closed end 15. Conduit 22 may be of any convenient cross-sectional configuration, but most suitably is a length of conventional pipe of circular cross section. The aperture 24 may be directed either vertically upward, or vertically downward with comparable results.

Figure 2:
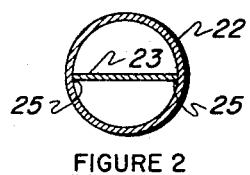
FIG. 2 is a cross-sectional view of the nozzle taken along the line 2—2 of FIG. 1 and showing the horizontal baffle installation.

Closed end 15 can be closed in any convenient manner so as to prevent discharge of the fluid therethrough. The horizontally extended baffle 23 is positioned within conduit 22 so as to extend essentially the full length of nozzle 21, terminating a distance from closed end 15. As illustrated in FIG. 2, horizontal baffle 23 is positioned within conduit 22 so as to divide the conduit 22 into an upper and a lower flow channel of approximately equal cross-sectional area. Baffle 23 extends from one inside wall of conduit 22 to the opposite inside wall and is held in position by a convenient means, such as welding as indicated at 25. Other conventional means may be used, provided the means do not appreciably increase the resistance to flow.

Referring again to FIG. 1, nozzle 21 passes through entry nozzle 18 which penetrates the vessel sidewall 20 and is fixedly attached thereto by welds 10 and 19, or other suitable means. Nozzle 18 is formed with a flanged face and boltholes for attachment of flanged pipe 11 by conventional stud bolts and nuts 12. Flange 13 is attached to the inlet end of conduit 22, similarly by weld 14, or other means such as a threaded joint. Flange 13 is mounted between the flanged faces of nozzle 18 and pipe 11 and firmly secured there by stud bolts and nuts 12. Gaskets 16 and 17 are inserted between the matting surfaces to obtain a fluidtight joint. The aforesaid flanged assembly not only provides a fluidtight joint for entry of the nozzle 21 through the vessel sidewall 20, but further provides the necessary support to maintain nozzle 21 in a horizontal position. If desired, support means can also be provided on the interior of the vessel for support of nozzle 21. A nozzle of the above-described structure not only may be easily removed from the vessel by breaking the bolted connection between pipe 11 and nozzle 18, but also requires minimum additional vertical vessel height as there are no elements protruding from horizontal conduit 22, the distribution apparatus being wholly contained therein.

The nozzle of the present invention can be effectively employed to eject a gas, a liquid, or a mixed liquid-gas phase fluid. The baffle 23 extending essentially the full length of conduit 22 reduces the chance of concentrating the liquid phase in the lower flow channel. Conduit 22 should be of a sufficient cross-sectional flow area to accommodate the quantity of fluid without excessive pressure drop, or excessive velocity. Normally, aperture 24 should be sufficiently sized to minimize the fluid discharge velocity, thereby reducing the jet effect of the discharging fluid. With gaseous fluids, velocities in excess of 200 feet per second are usually undesirable, and gas velocities of less than 100 feet per second are preferred. Liquid velocities in excess of 50 feet per second are similarly undesirable in most applications, and velocities of less than 20 feet per second, are preferred.

In operation, fluid to be introduced into the vessel flows from a high-pressure source through pipe 11 to a horizontally mounted nozzle 21. In entering the horizontally mounted nozzle 21, the fluid is divided into two essentially equal streams of substantially equal quantity for passage through two flow channels within conduit 22, the streams being divided by horizontal baffle 23, which extends from pipe 11 to a point just short of the end wall 15. One flow stream flows the length of baffle 23, then on reaching the closed end 15 of conduit 22, is divided into a plurality of smaller streams by passing through a plurality of turning vanes 28 and 28a which form a troughlike configuration and which are located between the end of baffle 23 and end wall 15. As the flow stream is divided and turned the streams are moving in an essentially reverse direction to the original direction of flow and are flowing backwardly through the other flow channel toward aperture 24. The flow streams, upon reaching aperture 24 are divided into a plurality of vertically directed streams by a series of arcuate turning vanes 27 and 27a and baffle 26 which extends from the lower side of baffle 23 terminating at a point just short of aperture 24. The fluid flowing through the shortest channel has a direct route to aperture 24, but like the other fluid stream is turned to a vertical direction by a series of arcuate turning vanes 29 and 29a located at the aperture, and by the vertically directed baffle 26 depending from horizontally positioned baffle 23. The two streams are combined at the aperture 24, discharging vertically therethrough in a flow pattern having substantially horizontal symmetry.

Figure 5:
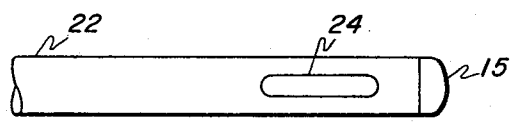
FIG. 5 is a bottom view of a horizontal nozzle having an elongated aperture.

Aperture 24 can be of any shape, and is typically of circular cross section. An aperture of circular cross section is preferred in the case where the aperture is located in a relatively flat surface, such as where conduit 22 is formed with a square or a rectangular cross section or where the diameter of the aperture is small in relation to the circumference of the conduit. However, in the usual case where conduit 22 is a length of pipe of circular cross section, a circular aperture forms an oval discharge pattern, the longer axis of the oval lying normal to the axis of the pipe. This nonregular pattern is caused by the curvelinear shape of the aperture due to the curvature of the conduit walls. Particularly where the aperture covers a substantially large portion of the circumference of the conduit, the tendency is for the fluid to be discharged in an oval pattern. This effect can be largely minimized by utilizing an axially elongated aperture, as illustrated in FIG. 5, wherein the aperture has a length parallel to the axis of the pipe greater than the width normal to the axis. However, various shapes of elongated apertures may be employed to advantage, depending upon any particular application.

The width of the aperture is limited by the size of the structure in which it is cut. In the case of a conduit of circular cross section, the aperture width should not exceed one-half of the circumference of the conduit, being limited to this dimension by the position of the horizontal baffle.

In practicing the present invention, the width and length of the aperture can be determined to suit the particular application of the quench nozzle. Preferably, the aperture is removed from a position adjacent the end of the baffle 23 sufficiently that fluid flowing around the end of the baffles 23 through the turning vanes 28 and 28a is restored to substantially horizontal flow, being turned by arcuate turning vanes 27 and 27a and baffle 26.

Figure 4:
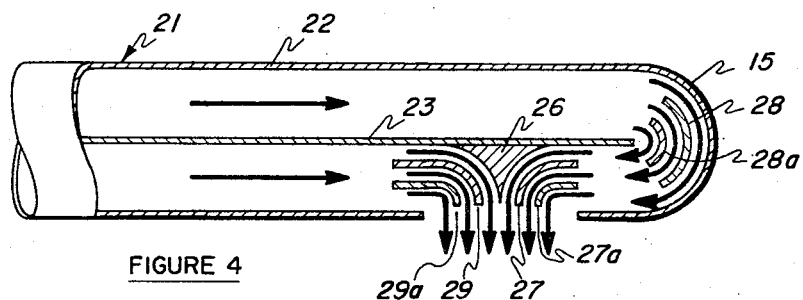
FIG. 4 is an enlarged elevational view, in cross section, illustrating in greater detail the horizontal nozzle of FIG. 1 having turning vanes positioned at the fluid exit aperture and at the end of the nozzle to achieve equal flow through each channel resulting in uniform vertical downflow from the aperture.

It has been determined that flow through each of the flow channels formed by baffle 23 are essentially equal. However, in some applications, the difference in flow length that the two fluid streams must traverse, and the additional resistance to the change in direction results in a large flow through the more direct of the flow channels. This flow imbalance may be overcome by lengthening the arc of the arcuate turning vanes 29 and 29a on the short distance side of baffle 26 or by increasing the number of arcuate turning vanes located in the shorter flow channel. The added restriction and resistance should be selected to achieve substantially equal flow of fluid to the aperture 24 through each of the flow channels formed by the horizontal baffle 23. The turning vanes and baffle arrangement is more clearly illustrated in FIG. 4, wherein the troughlike turning vanes 28 and 28a are shown changing the direction of flow of the fluid traversing the upper flow channel in conduit 22, the fluid then being directed in the opposite direction toward baffle 26 being turned to a substantially vertical direction by arcuate turning vanes 27 and 27a. The arcuate turning vanes 29 and 29a located to the left of baffle 26, in the shorter flow channel, may be lengthened or the number of these turning vanes increased to increase the resistance of flow to more completely equalize the velocity of the fluid exiting at the aperture. The present invention has overcome the disadvantages inherent in prior art baffle arrangement by the inclusion of turning vanes which more closely controls fluid velocities and direction of flow.

Generally, the method of the invention encompasses passing two or more confined fluid streams of substantially equal quantities and in substantially equal velocities in a horizontal direction toward a vertically directed outlet, the opposed fluids impinging against and being turned and divided by arcuate turning vanes positioned in the fluid flow stream whereby the fluids are directed in a vertical direction while discharging through the outlet. The outlet may be merely an aperture in the conduit wall, as no special conduit extension to direct flow in the vertical direction is required. As a result of the fluids impinging against the turning vanes, and being turned thereby, the fluids issue from the outlet substantially in the vertical direction and uniformly distributed about a vertical axis to effect a symmetrical flow pattern, due to the fact that the streams contact one another only after the separate streams have been turned from a horizontal to the vertical direction.

In the usual case of introducing a fluid under pressure into a lower pressure fluid medium, the fluid to be injected is transported from a higher pressure source to the lower pressure medium by flowing through a closed conduit. Within the lower pressure medium and adjacent the point of discharge the conduit is oriented in a horizontal position, the fluid flowing therethrough in a substantially horizontal direction. The fluid to be injected is divided into two or more portions of substantially equal quantity to form a first and second fluid stream flowing within separate channels of the conduit. The direction of flow of at least one of the fluid portions is reversed to cause the streams to flow in opposition to each other toward the previously described vertically directed outlet and turning vanes with baffle combination. The several fluid streams meet after exiting through the vertically directed outlet each being discharged vertically therefrom in a substantially symmetrical flow pattern due to the turning vanes and baffle located immediately preceding the vertically directed outlet.

Although the above-described apparatus is a preferred means of forming the method of the invention, it is apparent that the method of the invention can be practiced with other apparatus than specifically described, such as a conduit formed in a flat horizontal circle, or donut shape, having a fluid inlet and a vertically directed discharge aperture removed about the circle from the inlet; or with a horizontal conduit having a vertically directed aperture and fluid inlets at either end of the conduit, the fluid to be ejected flowing from either end of the conduit toward the aperture.

As previously mentioned, one application to which the injection nozzle of this invention is particularly suited is the injection of a cold quench fluid into a downwardly flowing mixed-phase reaction mixture as a means of cooling the reaction mixture and controlling the reaction temperature. The invention is equally applicable to the heating of a reaction mixture by the injection of a hot quench gas thereinto, or to the injection of a reactant fluid into a vertically flowing reactant mixture. The invention is particularly adaptable to the injection of a fluid into a contacting vessel at an intermediate point between space contacting zones within the vessel.

Figure 3:
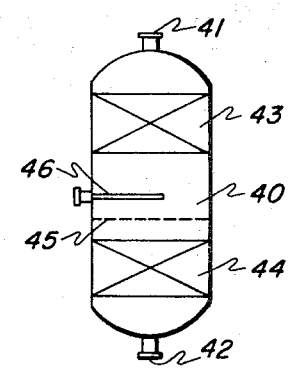
FIG. 3 is a schematic diagram illustrating the installation of an injection nozzle in a contacting vessel for introducing a fluid thereinto intermediate two spaced contacting zones.

The above-described installation of the injection nozzle of this invention intermediate to spaced contacting zones of a contacting vessel is further illustrated in FIG. 3 wherein is seen closed vertical contacting vessel 40 having a top fluid inlet nozzle 41 and a bottom fluid outlet nozzle 42. The contacting vessel contains an upper contacting zone 43 and a spaced lower contacting zone 44. Horizontal injection nozzle 46 is installed intermediate the contacting zones 43 and 44 in a manner previously described with reference to the installation of the injection nozzle 21 of FIG. 1. In addition, suitable well-known mixing devices 45 can be located in spaced relationship immediately above the lower contacting zone 44.

I claim:

1. A method of introducing a fluid under pressure into a lower pressure medium so that said fluid is discharged vertically into said medium, which comprises:
    a. transporting said fluid from a higher pressure source to said lower pressure medium through an enclosed conduit, said fluid flowing in a substantially horizontal direction within said lower pressure medium;
    b. dividing said fluid into at least two essentially equal streams within said conduit so that the so formed first and second streams flow within separate channels of said conduit from the point of separation of said streams to a point of discharge from said conduit;
    c. dividing at least one of said first and second fluid streams into a plurality of streams while changing the direction of flow of said divided stream 180° to said stream's original direction of flow; and
    d. dividing each of said first and second fluid streams into a plurality of streams while diverting their direction of flow from the horizontal to a vertical direction, said streams being then discharged through an aperture into said low-pressure medium as a plurality of vertically directed smaller streams.

2. A nozzle for discharging a horizontally flowing fluid in a substantially vertical direction which comprises:
    a. a horizontally positioned, elongated conduit having a closed end and an open end, said conduit being divided into at least two channels of substantially equal cross-sectional area extending from the open end of said conduit to a point just short of the closed end of said conduit;
    b. said channels being separated from each other by a horizontal baffle extending from one inside wall of said conduit to the opposite inside wall thereof and said baffle extending from the open end of said conduit to a point short of the closed end of said conduit;
    c. said conduit having a vertically directed aperture therein at a point removed from said closed end;
    d. at least one channel being in fluid communication with the aperture by means of a plurality of channels formed by a plurality of turning vanes positioned between the end of said baffle and the closed end of said conduit, each of said turning vanes forming a trough extending laterally across said conduit in diminishing size from the trough located nearest the closed end of said conduit; and
    e. further providing a vertical transverse baffle attached to said horizontal baffle normal to the axis of said conduit and positioned adjacent and substantially at the midpoint of said aperture so as to divert fluid flowing in either direction toward said aperture outwardly through said aperture, and adjacent said vertical transverse baffle on both sides thereof a plurality of turning vanes each forming an arc commencing at a point just before reaching the periphery of said aperture and terminating at the aperture.